United States Patent
Wantling

(10) Patent No.: US 7,374,610 B2
(45) Date of Patent: May 20, 2008

(54) WAX EMULSIONS FOR GYPSUM PRODUCTS

(75) Inventor: Steven J. Wantling, Brandon, MS (US)

(73) Assignee: Hexion Specialty Chemicals, Inc., Columbus, OH (US)

(*) Notice: Subject to any disclaimer, the term of this patent is extended or adjusted under 35 U.S.C. 154(b) by 110 days.

(21) Appl. No.: 11/410,738

(22) Filed: Apr. 25, 2006

(65) Prior Publication Data

US 2007/0245931 A1 Oct. 25, 2007

(51) Int. Cl.
- C04B 24/02 (2006.01)
- C04B 11/00 (2006.01)
- C04B 16/00 (2006.01)
- C04B 24/00 (2006.01)
- C04B 40/00 (2006.01)
- C04B 103/65 (2006.01)
- C09D 191/06 (2006.01)
- C09K 3/18 (2006.01)

(52) U.S. Cl. .................... 106/271; 106/2; 106/778; 106/781; 106/822; 516/77

(58) Field of Classification Search ............ 106/2, 106/271, 778, 781, 822; 516/77
See application file for complete search history.

(56) References Cited

U.S. PATENT DOCUMENTS

| | | | | |
|---|---|---|---|---|
| 3,891,453 A | * | 6/1975 | Williams | 524/5 |
| 3,935,021 A | * | 1/1976 | Greve et al. | 524/4 |
| 4,019,920 A | * | 4/1977 | Burkard et al. | 106/780 |
| 4,042,409 A | * | 8/1977 | Terada et al. | 106/660 |
| 4,094,694 A | * | 6/1978 | Long | 524/5 |
| 4,174,230 A | * | 11/1979 | Hashimoto et al. | 106/660 |
| 4,392,896 A | * | 7/1983 | Sakakibara | 156/39 |
| 4,421,704 A | * | 12/1983 | Reily | 264/133 |
| 4,748,196 A | * | 5/1988 | Kuroda et al. | 524/43 |
| 5,009,269 A | * | 4/1991 | Moran et al. | 166/293 |
| 5,120,355 A | * | 6/1992 | Imai | 106/2 |
| 5,482,551 A | * | 1/1996 | Morris et al. | 106/772 |
| 5,695,553 A | * | 12/1997 | Claret et al. | 106/778 |
| 5,922,447 A | * | 7/1999 | Baig | 428/292.7 |
| 5,968,237 A | * | 10/1999 | Sinnige | 106/2 |
| 5,980,628 A | * | 11/1999 | Hjelmeland et al. | 106/778 |
| 6,010,596 A | * | 1/2000 | Song | 162/158 |
| 6,066,201 A | * | 5/2000 | Wantling | 106/271 |
| 6,162,839 A | * | 12/2000 | Klauck et al. | 106/778 |
| 6,165,261 A | * | 12/2000 | Wantling | 106/778 |
| 6,172,122 B1 | * | 1/2001 | Lawate et al. | 516/109 |
| 6,585,820 B2 | | 7/2003 | Wantling et al. | |
| 6,663,707 B2 | | 12/2003 | Wantling et al. | |
| 2005/0250858 A1 | | 11/2005 | Wantling et al. | |
| 2006/0051619 A1 | | 3/2006 | Wantling et al. | |

* cited by examiner

*Primary Examiner*—Anthony J Green

(57) ABSTRACT

Emulsions, useful for imparting water resistance to gypsum products are disclosed. The emulsions of the invention include at least one wax, an alkyl phenol and a hydrophyllic metallic salt, preferably magnesium sulfate. The emulsions of the invention do not require the addition of a starch compound and therefore exhibit enhanced stability even at higher solids content then compared to prior art emulsions.

20 Claims, No Drawings

WAX EMULSIONS FOR GYPSUM PRODUCTS

FIELD OF THE INVENTION

The present invention relates to emulsions useful in imparting water resistance to gypsum products. Specifically, the present invention relates to wax emulsions which includes at least one wax, an alkyl phenol and a hydrophilic metallic salt, preferably magnesium sulfate. The emulsions of the invention do not require the addition of a starch compound and therefore exhibit enhanced stability even at higher solids content then compared to prior art emulsions. In addition the present invention relates to methods of preparing the wax emulsions and to articles prepared therefrom.

BACKGROUND OF THE INVENTION

Certain properties of gypsum (calcium sulfate dihydrate) make it very popular for use in making industrial and building products; especially gypsum board. It is a plentiful and generally inexpensive raw material which, through a process of dehydration and rehydration, can be cast, molded or otherwise formed to useful shapes. The base material from which gypsum board is manufactured is the hemihydrate form of calcium sulfate (gypsum), commonly termed stucco, which is produced by the heat conversion of the dihydrate from which the water phase has been removed.

In the making of gypsum board, the gypsum slurry must flow onto a paper substrate. In a continuous process, the slurry/substrate combination is then sized by passing this combination between rollers. Simultaneous with this sizing step, a paper backing is positioned over the sized gypsum slurry. Accordingly, the gypsum slurry must possess sufficient fluidity so that a properly sized gypsum board can be made. Fluidity refers to the ability of the gypsum slurry to flow.

It is also important to the manufacture of gypsum board, that the gypsum slurry be capable of being foamed to a limited extent. Foamability refers to this ability to be foamed. When the gypsum slurry and paper substrate are passed through the sizing rollers, a certain amount of the gypsum slurry must back flow and accumulate in the rollers nip so that a steady flow of gypsum is delivered to the sizing rollers. Foamability is important to this ability of the gypsum slurry to back flow at the rollers nip. Forming plates maybe used, eliminating the use of a master roll, but foaming is important to control the density of the finished product.

Because of the continuous nature of a gypsum board manufacturing process wherein the gypsum slurry flows onto a substrate which then passes through sizing rollers, the extent to which the gypsum slurry flows after it is sized is critical to maintaining the finished product dimensions of the gypsum board. The time at which the gypsum slurry ceases its flow is referred to as the pre-set time. Therefore, pre-set time is an important property of the gypsum slurry. The set time of the gypsum slurry is also an important property. The set time refers to the amount of time it takes the gypsum slurry to be dried, under heat, to the finished, solid gypsum board. As is well known in the art, in a continuous gypsum board manufacturing process, it is important that the gypsum slurry possess a consistent set time.

Gypsum board absorbs water, which reduces the strength of the wallboard. Prior art products, like ordinary gypsum board, gypsum tile, gypsum block, gypsum casts, and the like have relatively little resistance to water. When ordinary gypsum board, for example, is immersed in water, the board quickly absorbs a considerable amount of water, and loses a great deal of its strength. Actual tests have demonstrated that when a 2 inch by 4 inch cylinder of gypsum board core material was immersed in water at about 70° F. (21.1° C.), the cylinder showed a water absorption of 36% after immersion for 40 minutes.

Previous attempts to provide water-resistant properties to gypsum board include incorporation of asphalt, metallic soaps, resins, and wax additives into a aqueous gypsum slurry. The resulting materials were difficult to use and the core properties difficult to control. Polysiloxane-based systems have also been used in attempts to impart water-resistance to gypsum board. However, the polysiloxane-based systems are both expensive and difficult to use. A finished gypsum product has also been coated with water resistant films or coatings. One specific example of a past attempt to provide a water-resistant gypsum product is the spraying of a molten paraffin, wax or asphalt into an aqueous gypsum slurry.

Another example of a prior art attempt to provide a water resistant gypsum product is the addition of an emulsion of wax, such as paraffin wax, and asphalt, in the relative proportions of from about 1 part to about 10 parts of asphalt per part of wax to the aqueous gypsum slurry. Since the asphalt is a relatively poor solvent for paraffin wax and similar wax at ordinary temperatures, the solution formed at high temperatures tends on cooling to deposit microscopic wax crystals on the asphalt-wax surface.

Polyvinyl alcohol has been used in an attempt to provide a room temperature system for use in adding water resistant properties to gypsum. However, the polyvinyl alcohol system tends to rapidly separate and thus typically requires continuous mixing prior to use. The inherent instability of the polyvinyl alcohol systems tends to produce stratification of the compounds in the formulation. Therefore, the polyvinyl alcohol systems tend to be compositionally inconsistent. In addition, because of destabilization into different phases, there is also the potential for bacterial growth.

Accordingly, there is a need for an additive which is useful in imparting water-resistance to gypsum products, and which is economical to apply. There is a need for a water-resistance additive which does not require the use of costly components and without affecting fluidity, foamability, pre-set time or set time.

SUMMARY OF THE INVENTION

The emulsion for providing water-resistance to a gypsum product of the invention includes at least one wax, an alkyl phenol and magnesium sulfate. In one embodiment, the magnesium sulfate is in an amount of about 0.05% to about 5% by weight, based on the total weight of the emulsion. In another embodiment, no starch component is added to the emulsion. In another embodiment, the invention includes a method of preparing the emulsion for providing water-resistance to a gypsum product of the invention. In even another embodiment, the invention includes gypsum products prepared utilizing the emulsion of the invention.

DETAILED DESCRIPTION OF THE INVENTION

The present invention provides an emulsion which is useful in imparting water-resistance properties to gypsum products. The emulsions include at least one wax, an alkyl phenol and a hydrophyllic metallic salt, preferably magnesium sulfate. The emulsions of the present invention may be added to mixtures of gypsum and water without adversely affecting properties of the mixture which are necessary to the manufacture of gypsum products such as gypsum board.

Various sources of gypsum may be used in the compositions of the present invention. However, the amount of water required to hydrate a gypsum sample will vary with the purity of the sample.

Waxes useful in the emulsions of the invention may be selected from any of the commercially known waxes which have a melting point of from about 120° F. (48.9° C.) to about 150° F. (65.6° C.), and preferably from about 135° F. (57.2° C.). to about 145° F. (62.8° C.). Such waxes are typically of low volatility, exhibiting less than about a 10% loss in weight during standard thermogravimetric analysis. Also, the oil content of these waxes is typically less than about 1% by weight. These waxes are of a relatively high molecular weight, having an average chain length of about 36 or more carbon atoms ($C_{36}$ or higher). The hydrocarbon wax component may comprise any wax known in the field of gypsum slurry emulsions.

In certain embodiments, it is useful to saponify one or more of the waxes. In this way, the saponified wax functions as an added surfactant. Waxes useful in this respect are limited to waxes having an acid value or a saponification value and a melting point greater than about 180° F. (82.2° C.). Saponification of such waxes may be accomplished by combining the wax with a strongly basic material such as sodium hydroxide or potassium hydroxide. Waxes which may be saponified in the emulsions of the present invention include montan wax, carnauba wax, beeswax, bayberry-myrtle wax, candelilla wax, caranday wax, castor bean wax, esparto grass wax, Japan wax, ouricury wax, retamo-ceri mimibi wax, shellac, spermaceti wax, sugar cane wax, wool-lanolin wax, and others. The amount of strongly basic material needed to saponify a wax may be calculated based on the saponification value of the wax. For example, the saponification value divided by 1000 equals the grams of potassium hydroxide to add per gram of wax.

Incorporating alkyl phenols into the emulsions has been found important to achieving low water absorption in the final gypsum product. As used herein, "alkyl phenols" refer to phenolic compounds having a long chain alkyl group. The long chain alkyl group may be straight or branched. The long chain alkyl group may be from 24 to 34 carbon atoms ($C_{24}$ to $C_{34}$). Such alkyl phenols include long chain, $C_{24}$ to $C_{34}$ polymerized methylene-coupled alkyl phenol, phenate salts, calcium phenates, long branched chain calcium alkyl phenols, long straight chain calcium alkyl phenols and complex polymers of maleic acid with and without an amine group substitution. Suitable examples of commercially available alkyl phenols useful in the compositions of the present invention are $C_{24}$-$C_{34}$ polymerized methylene coupled alkyl phenol, FLOZOL 140, a complex polymer of maleic acid with no amine group substitution, FLOZOL 145, a complex polymer of maleic acid with amine group substitution, all available from Lubrizol Chemical Corp., Wycliffe, Ohio.

The emulsions of the present inventions include magnesium sulfate ($MgSO_4$) to eliminate the use of less stable ammonium hepta molybdate as dispersant for the wax, which also required starch as a suspension/gelation aid, and to be compatible with a wider range of available waxes (i.e. lower cost/lower melt point waxes). Examples of the starches utilized are described in U.S. Patent Application Publication No. 2005/0250858 A1 and in U.S. Pat. No. 6,663,707, both of which are incorporated herein by reference. Without wishing to be limited by theory, it is the inventor's belief that ammonium heptamolybdate functioned by breaking the wax, requiring the addition of a suspension/gelation aid (starch) to disperse the wax. However, the gelation state lead to unpredictable with respect to stability and performance. In contrast, $MgSO_4$ is more water soluble and therefore offered an opportunity to disperse wax, suspended as an emulsion, more uniformly through a stucco/core substrate, and to be compatible with a wider range and lower cost/lower melt point of available waxes. The $MgSO_4$ containing emulsion of the present invention also allows a reduction in the use of the alkylated phenol, which functioned as a dispersant in the historic system. As a result the wax emulsion of the present invention is significantly more stable than former or competitive systems and may be stored at a higher solids content, with out comprising the performance or stability of the emulsion.

The emulsions of the invention are stable for at least one 1 week, preferably for at least 1 month, and more preferably for at least 6 months. The typical mean solids content of the emulsions of the invention are at least 35% by weight, preferably at least 40% by weight, more preferably at least 45% by weight, more preferably at least 50%, more preferably at least 55% by weight, and even more preferably at least 60% by weight. Stability of the higher solids content emulsions are beneficial in the potential to reduce transportation costs.

Typical composition ranges for the emulsion of the invention useful in providing water-resistance to a gypsum product include any combination of the following. A least one wax in an amount of about 25% to about 40% by weight based on the total weight of the emulsion. A saponifiable wax in an amount of about 2.5% to about 4.5% by weight based on the total weight of the emulsion. The emulsions of the invention optionally contain an alkyl phenol in an amount of about 0.1% to about 10.0% by weight, preferably about 0.1% to about 5.0%, even more preferably from about 0.1% to about 2.0%, and most preferably between about 0.1% to about 1.0% based on the total weight of the emulsion. The amount of alkyl phenol required is reduced from that normally required in prior art formulations providing a cost reduction in the preparation of the emulsions of the invention. In one embodiment of the invention, the emulsion contains no alkyl phenol. A polynaphthalenesulfonic acid in an amount of about 0.25% to about 5.0% by weight based on the total weight of the emulsion; water in an amount of about 55% to about 65% by weight based on the total weight of the emulsion; an alkali metal hydroxide in an amount or about 0.5% to about 1.5% by weight based on the total weight of the emulsion. $MgSO_4$ in an amount of about 0.05% to about 5% by weight, preferably about 0.05% to about 3.0%, even more preferably from about 0.1% to about 2.5%, and most preferably between about 0.1% to about 1.0% based on the total weight of the emulsion.

The emulsions of the invention are stable for at least one 1 week, preferably for at least 1 month, and more preferably for at least 6 months. The typical mean solids content of the emulsions of the invention are at least 35% by weight, preferably at least 40% by weight, more preferably at least 45% by weight, more preferably at least 50%, more preferably at least 55% by weight, and even more preferably at least 60% by weight.

In order to provide a better understanding of the present invention including representative advantages thereof, the following examples are offered.

EXAMPLES

Table 1 lists the components and certain characteristics of the emulsion formulations utilized in the examples. In the preparation of the emulsions, the water and water soluble components were combined in a first mixture then heated to a temperature of between about 185° F. (85° C.) to about 205° F. (96.1° C.). The wax compounds were incorporated with the alkyl phenol in a second mixture and also heated to a temperature of between about 185° F. (85° C.) to about 205° F. (96.1° C.). The aqueous and wax mixtures where then combined and the resultant mixture was then placed in a homogenizer. With homogenization it is preferred that a distribution of micelle diameters ranging from about 0.6 micron to about 1.8 micron be achieved. However, the distribution of micelle diameters may range from about 0.5 micron to about 2.5 micron. This level of homogenization may be attained, for example, by using a dual orifice homogenizer operating at from about 2,000 to about 4,000 psig.

Tables 2, 3, 4 and 5 list fluidity and absorption data obtained for test specimens prepared utilizing the emulsions contained in Table 1. Table 3 includes date for the emulsions 4B, 4C, 6B and 6C further including 0.25 wt % Thiobendizole as an anti-bacterial agent. All test specimens were made by mixing 50 grams of stucco with the grams of water and emulsion specified in listed Tables 2, 3 and 4. For the control (BLANK), no emulsion was added. Gypsum, water and emulsion, if added, were mixed together and left to stand for one minute. This mixture was then mixed for an additional 30 seconds. After this second mixing, the specimens were poured out onto a flat surface and the diameter of the resulting patty was measured. The diameter of a patty is an index of the fluidity of the specimen. The larger the diameter, the more fluid the specimen. Patties made in the fluidity test were dried for at least 24 hours at 110° F. (43.3° C.). At the end of this time, the patties were weighed and the weight was recorded. The dried patties were then immersed in water for two hours. At the end of the two hour immersion, the patties were weighed and this wet weight was recorded. Percent water retention was then calculated based on the difference between these two recorded weights.

TABLE 1

Emulsion Formulations[1]

|  | 4B | 4C | 6B | 6C | 16A | 16B | 16C | 17A | 17B | 17C | 17D |
|---|---|---|---|---|---|---|---|---|---|---|---|
| Paraffin | 33.00 | 33.00 | 33.00 | 33.00 | 33.00 | 33.00 | 33.00 | 33.00 | 33.00 | 33.00 | 33.00 |
| Montan | 3.30 | 3.30 | 3.30 | 3.30 | 3.30 | 3.30 | 3.30 | 3.30 | 3.30 | 3.30 | 3.30 |
| Alkyl Phenol | 0.50 | 0.50 | 0.50 | 0.50 | 0.00 | 0.00 | 0.00 | 0.00 | 0.25 | 0.25 | 0.25 |
| DISAL[2] | 2.50 | 2.50 | 2.50 | 2.50 | 2.50 | 2.50 | 2.50 | 0.50 | 0.50 | 0.50 | 0.50 |
| Polyfon H[3] |  |  |  |  |  |  |  | 0.50 | 0.50 | 0.50 | 0.50 |
| 45% aq. KOH | 0.75 | 0.75 | 0.75 | 0.75 | 0.75 | 0.75 | 0.75 | 0.75 | 0.75 | 0.75 | 0.75 |
| $MgSO_4$ | 0.50 | 0.50 | 0.50 | 0.15 | 0.15 | 0.50 | 0.15 | 0.50 | 0.15 | 0.50 | 0.15 |
| Water | 59.45 | 59.45 | 59.45 | 59.80 | 60.30 | 59.95 | 60.30 | 61.45 | 61.55 | 61.20 | 61.55 |
| Total | 100.00 | 100.00 | 100.00 | 100.00 | 100.00 | 100.00 | 100.00 | 100.00 | 100.00 | 100.00 | 100.00 |
| Solids | 38.69 | 38.62 | 39.72 | 39.23 | 37.29 | 38.98 | 39.19 | 38.35 | 38.90 | 38.65 | 39.75 |
| pH | 11.32 | 11.37 | 11.25 | 12.35 | 12.59 | 16.0 | 12.58 | 11.27 | 12.39 | 11.27 | 12.38 |
| Viscosity cps | 16.50 | 23.50 | 17.00 | 18.00 | 12.0 | 11.46 | 17.0 | 12.5 | 11.0 | 15.0 | 15.5 |

[1]All component and solid values are % by wt.
[2]DISAL is a polynaphthalenesulfonic acid dispersant available from Handy Chemical, Montreal, Quebec, Canada.
[3]POLYFON H is a lignosulfonate dispersant available from MeadWestvaco Corporation, Stamford, Connecticut

TABLE 2

Water Absorption and Fluidity Data for Emulsions 4B, 4C, 6B and 6C

| Stucco (50 grams) | water/emulsion (grams/grams) | Emulsion | Diameter (inches) | Absorption % by wt |
|---|---|---|---|---|
| Savannah | 31/0 | Blank | 3¾ | 31.42 |
| Savannah | 28.65/3.85 | 4B | 3¼ | 1.26 |
| Savannah | 28.65/3.85 | 4B | 3¼ | 0.41 |
| Savannah | 28.65/3.85 | 4B | 3 5/16 | 5.20 |
| Savannah | 28.65/3.85 | 4C | 3½ | No Data |
| Savannah | 28.65/3.85 | 4C | 3½ | 0.3 |
| Savannah | 28.65/3.85 | 4C | 3¼ | 0.29 |
| Savannah | 28.75/3.75 | 6B | 3 5/16 | 0.16 |
| Savannah | 28.75/3.75 | 6B | 3¼ | 0.47 |
| Savannah | 28.75/3.75 | 6B | 3¼ | 0.05 |
| Savannah | 28.65/3.85 | 6C | 3 5/16 | 0.53 |
| Savannah | 28.65/3.85 | 6C | 3½ | 0.27 |
| Savannah | 28.65/3.85 | 6C | 3¼ | 0.44 |

TABLE 3

Water Absorption and Fluidity Data for Emulsion 4B, 4C, 6B and 6C including 0.25 wt % Thiobendizole

| Stucco (50 grams) | water/emulsion (grams/grams) | Emulsion | Diameter (inches) | Absorption % by wt |
|---|---|---|---|---|
| Savannah | 31/0 | Blank | 3⅞ | 28.99 |
| Savannah | 28.65/3.85 | 4B | 3¼ | 0.9 |
| Savannah | 28.65/3.85 | 4B | 3¼ | 0.5 |

TABLE 3-continued

Water Absorption and Fluidity Data for Emulsion 4B,
4C, 6B and 6C including 0.25 wt % Thiobendizole

| Stucco (50 grams) | water/emulsion (grams/grams) | Emulsion | Diameter (inches) | Absorption % by wt |
|---|---|---|---|---|
| Savannah | 28.65/3.85 | 4B | 3½ | −0.89 |
| Savannah | 28.65/3.85 | 4C | 3½ | 0.37 |
| Savannah | 28.65/3.85 | 4C | 3¼ | 0.42 |
| Savannah | 28.65/3.85 | 4C | 3½ | 0.52 |
| Savannah | 28.75/3.75 | 6B | 3½ | 0.42 |
| Savannah | 28.75/3.75 | 6B | 3½ | 0.13 |
| Savannah | 28.75/3.75 | 6B | 3¼ | 0.17 |
| Savannah | 28.65/3.85 | 6C | 3½ | 0.84 |
| Savannah | 28.65/3.85 | 6C | 3½ | 0.98 |
| Savannah | 28.65/3.85 | 6C | 3½ | 0.80 |

TABLE 4

Water Absorption and Fluidity Data for Emulsions 16A, 16B and 16C

| Stucco | Water/emulsion | Sample | Diameter | % absorption |
|---|---|---|---|---|
| Savannah | 31/0 | Blank | 3¾ | 31.97 |
| Savannah | 28.45/4.05 | 16A | 1¼ | 0 |
| Savannah | 28.45/4.05 | 16A | 2½ plop | 3.68 |
| Savannah | 28.45/4.05 | 16A | 2½ plop | 0.64 |
| Savannah | 28.65/3.85 | 16B | 2½ | 2.13 |
| Savannah | 28.65/3.85 | 16B | 2½ plop | 0.16 |
| Savannah | 28.65/3.85 | 16B | 2¾ | 0.41 |
| Savannah | 28.65/3.85 | 16C | 2¾ plop | 5.77 |
| Savannah | 28.65/3.85 | 16C | 2 plop | 0.35 |
| Savannah | 28.65/3.85 | 16C | 2½ plop | 0.4 |

TABLE 5

Water Absorption and Fluidity Data for Emulsions 17A, 17B, 17C and 17D

| Savannah | 31/0 | Blank | 3¾ | 30.51 |
|---|---|---|---|---|
| Savannah | 28.55/3.95 | 17A | 3¼ | 2.81 |
| Savannah | 28.55/3.95 | 17A | 3¼ | 2.97 |
| Savannah | 28.55/3.95 | 17A | 3¼ | 2.66 |
| Savannah | 28.65/3.85 | 17B | 3⅛ | 1.14 |
| Savannah | 28.65/3.85 | 17B | 3⅛ | 2.06 |
| Savannah | 28.65/3.85 | 17B | 3⅛ | 0.42 |
| Savannah | 28.65/3.85 | 17C | 3⅝ | 0.18 |
| Savannah | 28.65/3.85 | 17C | 3⅝ | 1.04 |
| Savannah | 28.65/3.85 | 17C | 3⅝ | 0.53 |
| Savannah | 28.75/3.75 | 17D | 3 | 0.80 |
| Savannah | 28.75/3.75 | 17D | 3¼ | 0.75 |
| Savannah | 28.75/3.75 | 17D | 3⅛ | 0.58 |

Table 7 sets forth a most preferred embodiment of the emulsion of the invention and Table 8 provides Water Absorption data for this preferred embodiment.

TABLE 7

Emulsion Formulation[1]

| Paraffin | 43 |
|---|---|
| Montan | 4.3 |
| Alkyl Phenol | 0.65 |
| DISAL[2] | 3.25 |
| 45% aq. KOH | 0.98 |
| MgSO$_4$ | 0.65 |
| WATER | 47.14 |
| SOLIDS | 51.85/T |

[1]All component and solid values are % by wt.
[2]DISAL is a polynaphthalenesulfonic acid dispersant available from Handy Chemical, Montreal, Quebec, Canada.

TABLE 8

Water Absorption Data for Emulsion Formulation in Table 7

| | | % ABSORPTION | | |
|---|---|---|---|---|
| | Dry Wt (lbs) | 2 Hour | 48 Hour | 120 Hour |
| 52 #/MSF WAX | 1725 | 5.10% | 4.90% | 4.60% |
| MIXER SPEED 324 ft/min | 1725 | 5.00% | 4.70% | 4.60% |
| | 1719 | 4.60% | 4.60% | 4.70% |
| 55.25 #/MSF WAX | 1725 | 5.30% | 4.50% | 4.50% |
| MIXER SPEED 324 ft/min | 1731 | 5.30% | 4.50% | 4.60% |
| | 1706 | 5.20% | 4.70% | 4.70% |
| 58.5 #/MSF WAX | 1719 | 5.20% | 4.50% | 4.50% |
| MIXER SPEED 324 ft/min | 1738 | 4.90% | 4.40% | 4.40% |
| | 1731 | 5.10% | 4.50% | 4.50% |
| 65 #/MSF WAX | 1731 | 5.30% | 4.40% | 4.30% |
| MIXER SPEED 324 ft/min | 1738 | 5.20% | 4.20% | 4.40% |
| | 1731 | 5.20% | 4.30% | 4.30% |
| STAGE #5 65 #/MSF WAX | 1731 | 4.90% | 4.30% | 4.50% |
| MIXER SPEED 300 ft/min | 1725 | 5.20% | 4.10% | 4.40% |
| | 1738 | 5.30% | 4.30% | 4.40% |
| CONTROL 65 #/MSF HENRY MIXER SPEED 324 ft/min | 1694 | | 3.90% | 4.40% |

While the present invention has been described and illustrated by reference to particular embodiments and examples, those of ordinary skill in the art will appreciate that the invention lends itself to variations not necessarily illustrated herein. For this reason, then, reference should be made solely to the appended claims for purposes of determining the true scope of the present invention.

I claim:

1. An emulsion for providing water-resistance to a gypsum product comprising at least one wax, an alkyl phenol and magnesium sulfate.

2. The emulsion of claim 1 wherein the magnesium sulfate is in an amount of about 0.05% to about 5% by weight, based on the total weight of the emulsion.

3. The emulsion of claim 1 wherein the magnesium sulfate is in an amount of about 0.1% to about 2.5% by weight, based on the total weight of the emulsion.

4. The emulsion of claim 1 wherein the magnesium sulfate is in an amount of about 0.1% to about 1.0% by weight, based on the total weight of the emulsion.

5. The emulsion of claim 1, provided however, that no starch component is added.

6. The emulsion of claim 1 wherein the at least one wax is in an amount of about 25% to about 40% by weight based on the total weight of the emulsion, and wherein the emulsion further comprises a saponifiable wax in an amount of about 2.5% to about 4.5% by weight, based on the total weight of the emulsion.

7. The emulsion of claim 6 further comprising an alkyl phenol in an amount of about 0.1% to about 1.0% by weight, based on the total weight of the emulsion.

8. The emulsion of claim 6 further comprising a polynaphthalenesulfonic acid in an amount of about 0.25% to about 5.0% by weight based on the total weight of the emulsion; water in an amount of about 55% to about 65% by weight based on the total weight of the emulsion; an alkali metal hydroxide in an amount or about 0.5% to about 1.5% by weight, based on the total weight of the emulsion.

9. The emulsion of claim 1, wherein the emulsion is stable for at least 1 month.

10. The emulsion of claim 1 having a solids content of greater than 45% by weight, based on the total weight of the emulsion.

11. A method for making an emulsion useful in providing water-resistance to a gypsum product, comprising the steps of
   (a) combining a first mixture comprising at least one wax and an alkyl phenol with a second mixture comprising magnesium sulfate and water,
   (b) combining the first mixture and the second mixture to form a resultant mixture, and
   (c) homogenizing the resultant mixture.

12. The method of claim 11 wherein the second mixture comprises magnesium sulfate in an amount of about 0.05% to about 5% by weight, based on the total weight of the emulsion.

13. The method of claim 11, provided however, that the emulsion does not contain a starch compound.

14. The method of claim 11 wherein the first mixture comprises at least one wax in an amount of about 25% to about 40% by weight based on the total weight of the emulsion, and wherein the first mixture further comprises a saponifiable wax in an amount of about 2.5% to about 4.5% by weight, based on the total weight of the emulsion.

15. The method of claim 14 wherein the first mixture comprises the alkyl phenol in an amount of about 0.1% to about 1.0% by weight, based on the total weight of the emulsion.

16. A gypsum product comprising gypsum and the emulsion of claim 1.

17. The gypsum product of claim 16 wherein the magnesium sulfate is in an amount of about 0.05% to about 5% by weight, based on the total weight of the emulsion.

18. The gypsum product of claim 16 wherein the magnesium sulfate is in an amount of about 0.1% to about 2.5% by weight, based on the total weight of the emulsion.

19. The gypsum product of claim 16 wherein the magnesium sulfate is in an amount of about 0.1% to about 1.0% by weight, based on the total weight of the emulsion.

20. The gypsum product of claim 16, provided however, that the emulsion does not contain a starch component.

* * * * *